United States Patent [19]

Asano

[11] Patent Number: 5,092,415
[45] Date of Patent: Mar. 3, 1992

[54] METHOD FOR WEIGHING THE HUMAN BODY AND THE LIKE

[76] Inventor: Fumitaka Asano, Urawa Park Heights 8-503, No. 33-8, Harayama 2-chome, Urawa-shi, Saitama, Japan

[21] Appl. No.: 597,980

[22] Filed: Oct. 12, 1990

[30] Foreign Application Priority Data

Apr. 17, 1989 [JP] Japan ................... 1-96966

[51] Int. Cl.⁵ ..................... G01G 5/04; G01G 19/52
[52] U.S. Cl. .................... 177/208; 177/144; 177/1
[58] Field of Search ............... 177/144, 208, 209, 254, 177/1

[56] References Cited

U.S. PATENT DOCUMENTS 3,789,873 2/1974 Westwood ............... 177/208 X
4,014,398 3/1977 Gresko .................... 177/208
4,498,550 2/1985 Menon .................... 177/209

Primary Examiner—George H. Miller, Jr.
Attorney, Agent, or Firm—Browdy and Neimark

[57] ABSTRACT

In a method for weighing a patient lying on a bed, an air mattress is put beneath the patient. Then, a flowing air is supplied to or discharged from the air mattress so as to balance the weight of the patient with a pressure of a body of air contained within the air mattress. At this time, the amount of the flowing air is measured together with variation of the pressure of the body of air contained within the air mattress, so that a relationship between the amount of the flowing air and the variation of the pressure of the body of air contained within the air mattress is established. Consequently, the weight of the patient may be calculated on the basis of the relationship between the amount of the flowing air and the variation of the pressure of the body of air contained within the air mattress.

4 Claims, 4 Drawing Sheets

METHOD FOR WEIGHING THE HUMAN BODY AND THE LIKE

BACKGROUND OF THE INVENTION

1. Field of the Invention

The present invention relates to a method for weighing a human body and the like, and more particularly to a method for weighing a patient confined to a bed in lying condition for a long period of time.

2. Description of the Prior Art

In today's medical care, since both of hemodialyzers and receiving solvent employed therein have been considerably improved, it is possible for a doctor to easily and precisely control the water content of a human body by the use of the hemodialyzers and the receiving solvents. However, in case that a patient to be treated in water content is confined to a bed in lying condition for a long period of time, it is difficult to determine a basal body weight of such patient. Especially, in case that the patient has a severe illness, since various medical-care tubes and monitoring wires are attached to the patient, it is further difficult to move the patient, and, therefore it is substantially impossible to weigh such patient.

Incidentally, there is a so-called "scale bed" for weighing a bed including a patient confined thereto. In this case, in order to determine the weight of the patient, it is necessary to determined an empty weight of the bed. However, in case that the patient has been confined to a bed for a long period of time, it is also substantially impossible to use such scale bed.

As described above, heretofore, it is difficult for the doctors to obtain up-to-date data of the weight of the patient confined to the bed. As a result, the doctors in charge can not utilize the up-to-date data of the weight of the patient for medical care.

SUMMARY OF THE INVENTION

It is an object of the present invention to provide a method for weighing a human body and the like, which method enables a doctor to easily weigh a patient confined to a bed in lying condition, thereby permitting the doctor to utilize up-to-date data of the weight of the patient for medical care.

In it another object of the present invention to provide a method for weighing a human body and the like, which method enables a doctor to weigh a patient lying in a bed, without distressing the patient.

It is further another object of the present invention to provide a method for weighing a human body and the like, which method may be adapted to weigh various articles.

In accordance with an aspect of the present invention, it is possible to accomplish the above objects of the present invention by providing:

A method for weighing a human body and the like, comprising the steps of:

putting an air mattress beneath the human body and the like being weighed;

supplying or discharging a flowing air into or from the air mattress to balance a pressure of a body of air contained within the air mattress with a weight of the human body and the like;

determining the amount of the flowing air being supplied into or discharged from the air mattress;

determining variation of the pressure of the body of air contained within the air mattress;

establishing a relationship between the amount of the flowing air and the variation of the pressure of the body of air contained within the air mattress; and determining the weight of the human body and the like on the basis of the relationship between the amount of the flowing air and the variation of the pressure of the body of air contained within the air mattress.

It is also possible to accomplish the above objects of the present invention by providing:

The method for weighing the human body and the like, as set forth in the above aspect of the present invention, wherein:

The step of supplying or discharging air into or from the air mattress to balance a pressure of a body of air contained within the air mattress with a weight of the human body and the like is repeated, and followed every time by the step of determining variation of the pressure of the body of air contained within the air mattress, whereby data of the variation of the pressure of the body of air contained within the air mattress is obtained.

It is also possible to accomplish the above objects of the present invention by providing:

The method for weighing the human body and the like, as set forth in the above aspect of the present invention, wherein:

The step of supplying or discharging the flowing air into or from the air mattress to balance a pressure of a body of air contained within the air mattress with a weight of the human body and the like is conducted simultaneously in a plurality of the air mattresses, and followed in each of the plurality of the air mattresses by the step of determining variation of the pressure of the body of air contained within the air mattress, whereby data of the variation of the pressure of the body of air conducted within the air mattress is obtained in each of the plurality of the air mattresses.

It is also possible to accomplish the above objects of the present invention by providing:

The method for weighing the human body and the like, as set forth in the above aspect of the present invention, wherein:

The step of supplying or discharging the flowing air into or from the air mattress to balance a pressure of a body of air contained within the air mattress with a weight of the human body and the like is conducted simultaneously in a plurality of the air mattresses to permit the plurality of the air mattresses to communicate with each other by the flowing air, and is followed in each of the plurality of the air mattresses by the step of determining variation of the pressure of the body of air contained within the air mattress, whereby data of the variation of the pressure of the body of air contained within the air mattress is obtained in each of the plurality of the air mattresses.

The above objects, additional objects, additional features and advantages of the present invention will be clarified to those skilled in the art hereinbelow with reference to the following description and accompanying drawings illustrating preferred embodiments of the present invention according to the principles of the present invention.

DESCRIPTION OF THE PREFERRED EMBODIMENTS

Hereinbelow, preferred embodiments of the present invention will be described in detail with reference to the accompanying drawings.

In accordance with the present invention, a human body and the like is put on a pneumatic or air mattress, and is weighed by utilizing a variation of pressure of a body of air contained within the air mattress.

Figure 1:
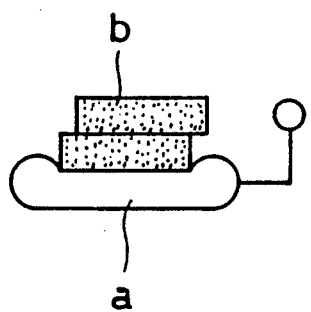
FIGS. 1 to 8 are views illustrating the principles of the present invention.

However, there is not any simple relationship between: the pressure of the body of air contained within the air mattress; and the weight of the human body and the like. In other words, as shown in FIG. 1, when a pair of suitable articles "b" stacked together are put on an air mattress "a", a pressure of a body of air contained within the air mattress "a" reaches a value of P so as to be balanced with a total weight W of the articles "b" which make contact with the air mattress "a" through a touch area S. In this case, the total weight W of the articles "b" is equal to the product of the touch area S and the pressure value P as follows:

$$W = S \times P$$

Figure 2:
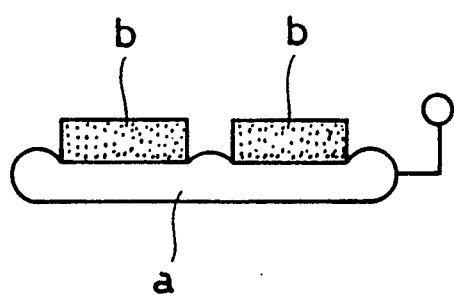

In the above equation, if the touch area S remains constant, the total weight W of the articles "b" will be proportional to the pressure value P of the body of air contained within the air mattress "a". On the other hand, as shown in FIG. 2, in case that a pair of the articles "b" spaced apart from each other are put on the air mattress "a", a pressure of a body of air contained within the air mattress "a" reaches a half of the pressure value P. Consequently, unless a total touch area through which the articles "b" make contact with the air mattress "a" is determined, it is impossible to determine the total weight W of the articles "b". Therefore, in case that a human body lying on the air mattress "a" must be weighed, since the touch area through which the human body makes contact with the air mattress "a" largely depends upon a body size and lying posture of the human body together with a specific shape and construction of the air mattress "a", it is impossible to precisely determine the touch area, and, therefore it is generally impossible to determine the weight of the human body within a desired tolerance. In contrast with such prior art, the present invention enables a user or doctor to determine the weight of the human body and the like on the air mattress "a".

First, the principles of the method of the present invention will be described.

Figure 3:
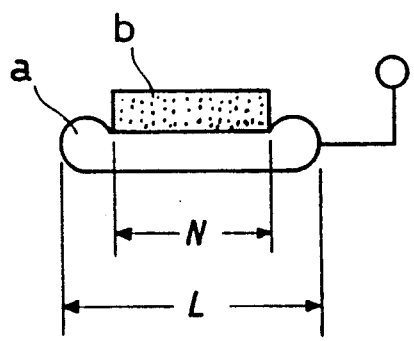

As shown in FIG. 3, an article "b" is put on an air mattress "a". In FIG. 3 and the following equation (1): each of the articles "b" and the air mattress "a" has a unit length in depth i.e., in a direction perpendicular to a plane of the drawing paper; 1 denotes the amount of a cross-sectional area of the air mattress "a"; N denotes the amount of a touch area through which the article "b" makes contact with the air mattress "a", provided that $0 \leq N \leq 1$; Q denotes a volume per unit length of the air mattress "a"; and F denotes a flow rate (volume/unit time) of air entering the air mattress "a". In this case, a graph or curve of variation in pressure of a body of air contained within the air mattress "a" is shown as a function of time. Consequently, a pressure of the body of air contained within the air mattress "a" begins to increase at a time $T_N$ defined by the following equation (1):

$$T_N = (1-N)Q/F \tag{1}$$

Figure 4:
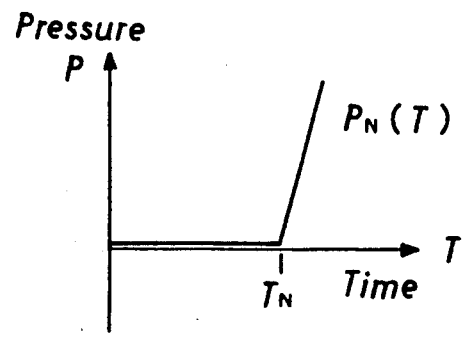

Consequently, as is clear from FIG. 4, the slope or gradient $P_N$ of the above curve of variation in pressure of the body of air contained within the air mattress "a" is defined by the following equation (2):

$$P_N = (\alpha \cdot F/(1-N)Q) - \beta \tag{2}$$

In the equation (2), both of the $\alpha$ and the $\beta$ are independent of the N. Consequently, it is possible to define: $\alpha = 1$; $\beta = 1$; a time (at which the pressure of the body of air contained within the air mattress "a" begins to increase in a condition in which the $N=0$) $=1$; and the $F/Q =$ an arbitrary constant. As a result, the equation (2) may be transformed into the following linear equation (3) which is a function of a time (T):

$$P_N(T) = (1/(1-N)) \cdot T - 1 \tag{3}$$

Figure 5:
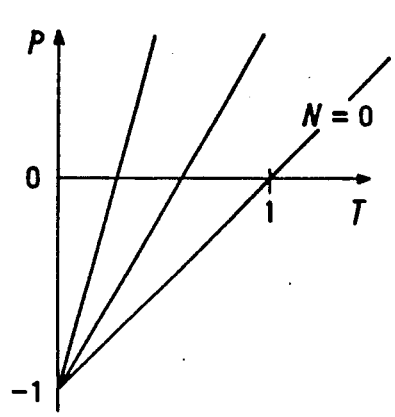

Consequently, as is clear from FIG. 5, the function $P_N(T)$ represents a linear graph intersecting a vertical or pressure axis (P) at a point of minus 1.

Figure 6:
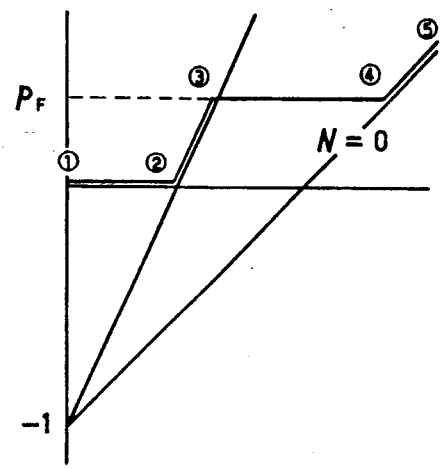

On the other hand, in a condition in which the article "b" is put on the air mattress "a", variation in pressure of the body of air contained within the air mattress "a" is represented by a stepped graph having points (1) to (5) as shown in FIG. 6.

In the stepped graph shown in FIG. 6: a first period of time between the points (1) and the point (2) of the stepped graph permits air to enter the air mattress "a" to freely inflate the same "a" in a portion free from the article "b" having been put on the air mattress "a"; a second period of time between the point (2) and the point (3) of the stepped graph permits additional air to enter the air mattress "a" to increase a pressure of a body of air contained within the air mattress "a" without lifting the article "b"; a third period of time between the point (3) and the point (4) of the stepped graph permits further additional air to enter the air mattress "a" so that the air mattress "a" begins to lift the article "b" and is then completely inflated; and a fourth period of time between the point (4) and the point (5) of the stepped graph permits still further additional air to enter the air mattress "a" to further increase the pressure of the body of air contained within the air mattress "a". In the third period of time between the point (3) and the point (4) of the stepped graph shown in FIG. 6, the weight of the article "b" balances with the pressure of the body of air contained within the air mattress "a", which pressure is denoted by the reference character $P_F$ in FIG. 6. In this connection, since the weight of the article "b" is the product of such pressure $P_F$ and the amount of a touch area N through which the article "b" makes contact with the air mattress "a", it is possible to determine the weight of the article "b" by the use of the pressure $P_F$ and the amount of such touch area N if the latter N is known.

In a method for determining the amount of the touch area N by the use of the stepped graph shown in FIG. 6 having the points (1) to (5), the first period of time between the point (1) and the point (2) of the stepped graph is an important factor. Since the above first period of time is proportional to a value of (1-N) and is known in a condition in which the $N = 0$, it is possible to known the amount of the touch area N if the first period of time is known in a condition in which the N is not 0.

There is another method for determining the amount of the touch area N, which method utilizes the slope or gradient of the stepped graph shown in FIG. 6 during the second period of time between the point (2) to the point (3) of the graph. In the another method for determining the amount of the touch area N, it is possible to easily know the amount of the touch area N from the equation (2).

There is further another method for determining the amount of the touch area N. The further another method utilizes parameters which comprise: the amount of the touch area N; and the pressure $P_F$, and correlate with the weight of the article "b" or human body and the like.

Figure 7:
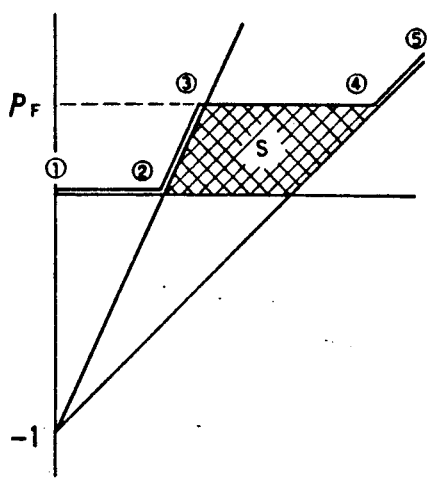
Figure 8:
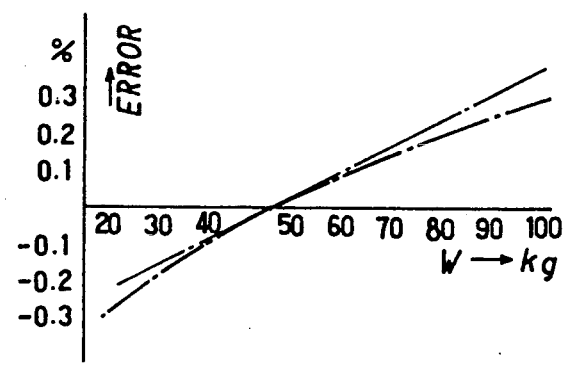

Namely, in the further another method for determining the amount of the touch area N, as shown in FIG. 7, an area S, which is surrounded by line segments between: the points (2) and (3); the points (3) and (4); the point (4) and a point 1 on the horizontal or time (T) axis; and the point (2) and the point 1 on the time (T) axis, correlates with the weight of the article "b" or human body and the like. Although a one-to-one correlation is not realized between the area S and the weight of the article "b" or human body or the like, since the pressure (of the body of air contained within the air mattress "a") employed in determining the weight of the human body is considerably small, the area S shows a good correlation with the weight of the human body having been put on the air mattress "a". FIG. 8 shows a graph in which: a vertical axis indicates error or tolerance (%); and a horizontal axis indicates weight (Kg). The graph shown in FIG. 8 is obtained by using parameters resembling those of a human body having a weight W (a standard of which W is 50 Kg and is ranging from 20 to 100 Kg) to plot points showing the relationship between the weight W and the area S shown in FIG. 7. As is clear from the thus obtained graph shown in FIG. 8, an error in determining the weight W of 50 Kg is substantially up to 0.1%, thereby permitting the graph shown in FIG. 8 to be employed in determining the weight of the human body. In this case, it is also possible to adapt a so-called "curve fitting" technique to the graph shown in FIG. 8, through which curve fitting technique a suitable curve is selected in comparison with a plurality of curves of the pressure of the body of air contained within the air mattress "a" (hereinafter referred to as the pressure curves) to enable the user or doctor to find the pressure in terms of the weight of the human body and the like.

Although the above description relates to the pressure curves of air flowing into the air mattress "a", it is clearly understood that a graph similar to that shown in FIG. 8 may be obtained by using a method for determining the weight of the human body and the like, which method is carried out in a condition in which: air filled in the air mattress "a" flows out of the same "a"; or air alternately flows into and flows out of the air mattress "a"; or a plurality of the air mattresses "a" are alternately inflated and deflated with each other; or air is permitted to flow out of one of the air mattresses "a" to the others.

Now, the method of the present invention will be described more specifically.

Figure 9:
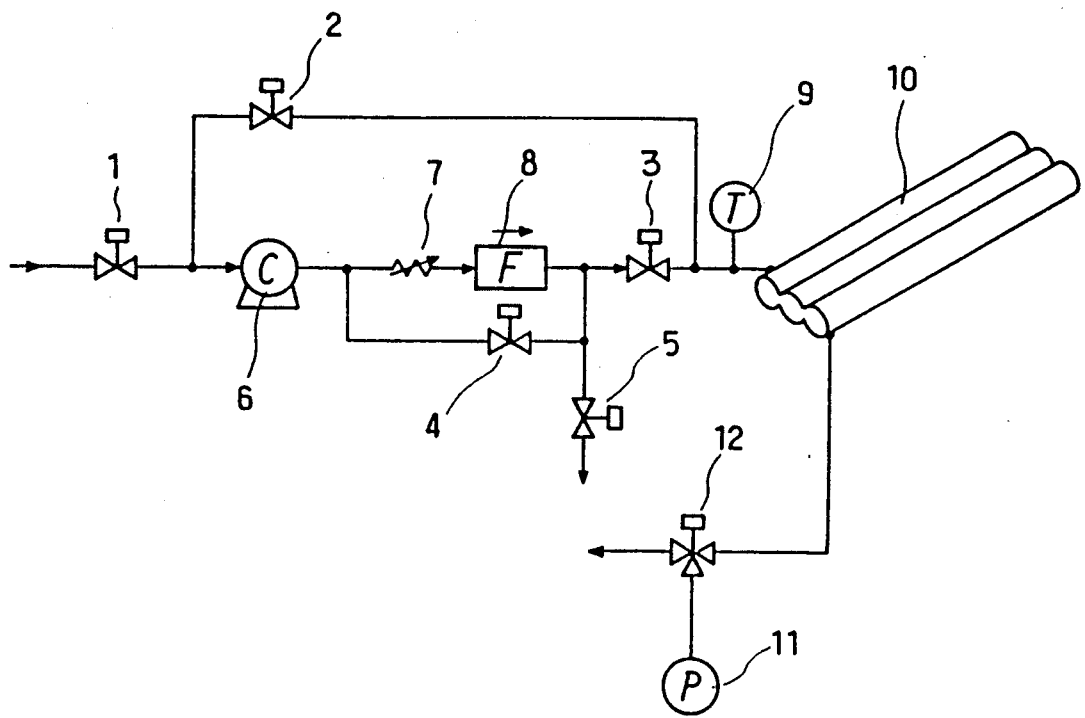
FIG. 9 is a schematic block diagram of a system for carrying out the method of the present invention.

FIG. 9 is a schematic block diagram of a system for carrying out the method of the present invention, in which system: each of the reference numerals 1 to 5 denotes a solenoid operated valve for controlling a flow direction of air; 6 an air compressor; 7 a flow metering valve for keeping the flow of air steady; 8 a gas flow meter such as a mass flow meter and a gas flow controller and the like for issuing an output signal proportionate to a mass of gas being controlled; 9 a temperature sensor; 10 an air mattress; 11 a pressure gauge; and 12 a three-way valve which is employed to confirm the atmospheric pressure since a fine control of the pressure of air is required in carrying out the method of the present invention.

As for the system for carrying out the method of the present invention shown in FIG. 9, as an example, the system for carrying out the method of the present invention for weighing the human body and the like in a condition in which air flows out of the air mattress "a" will be described hereinbelow. In operation of the system, first, each of the solenoid operated valves 1, 3, 4 is opened, while each of the solenoid operated valves 2, 5 is closed, thereby permitting the pressure of a body of air contained within the air mattress "a" to increase. Then, the three-way valve 12 is operated to direct the flow of air to the air mattress "a", thereby permitting the pressure of air contained within the air mattress "a" to reach a predetermined value. After the pressure of air reaches the predetermined value, the supply of air to the air mattress "a" is stopped. Then, the three-way valve 12 is operated to enable the user or doctor to confirm the atmospheric pressure through the pressure gauge 11. After that: the three-way valve is operated again to direct the flow of air to the air mattress "a"; the solenoid operated valves 1, 3 are closed; and the solenoid operated valves 2, 5 are opened to permit the air contained within the air mattress "a" to steadily flow out of the air mattress "a", whereby the flow rate of the air flowing out of the air mattress "a" and variation of the pressure of air contained within the air mattress "a" are determined, which flow rate and the variation of the pressure of air are utilized to determine the weight of the human body and the like. In determining the weight of the human body and the like, the temperature sensor 9 is used to determine a temperature of the air contained within the air mattress "a". The amount of air mass flow rate determined by the gas flow meter 8 is converted to that of air volume flow rate through compensation based on the temperature determined by the temperature sensor 9. The operation of the system for weighing the human body and the like is completed when the pressure gauge 11 shows that the pressure of air contained within the air mattress "a" reaches a negative value. After completion of the above operation, the three-way valve 12 is operated again to permit the user or doctor to confirm the atmospheric pressure through which the drift of gauge pressure indicated by the pressure gauge 11 is determined, whereby the weight of the human body and the like is compensated with respect to such drift of the gauge pressure so as to be a value nearest to the true weight of the human body and the like.

Figure 10:
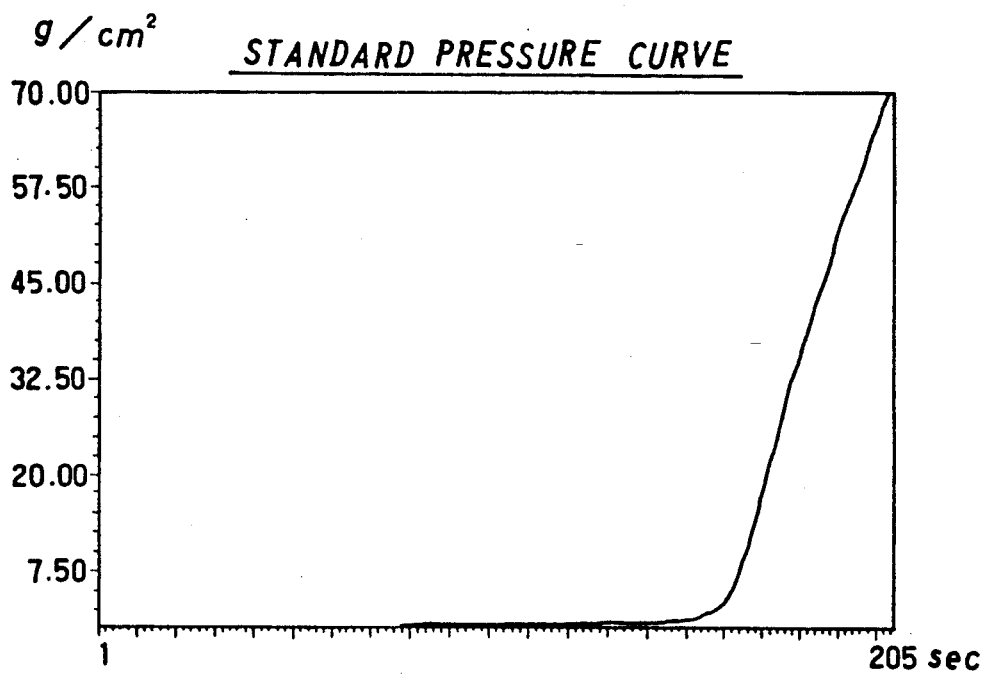
FIGS. 10(A) and (B) are diagrams of data obtained by the use of the method of the present invention.
Figure 10:
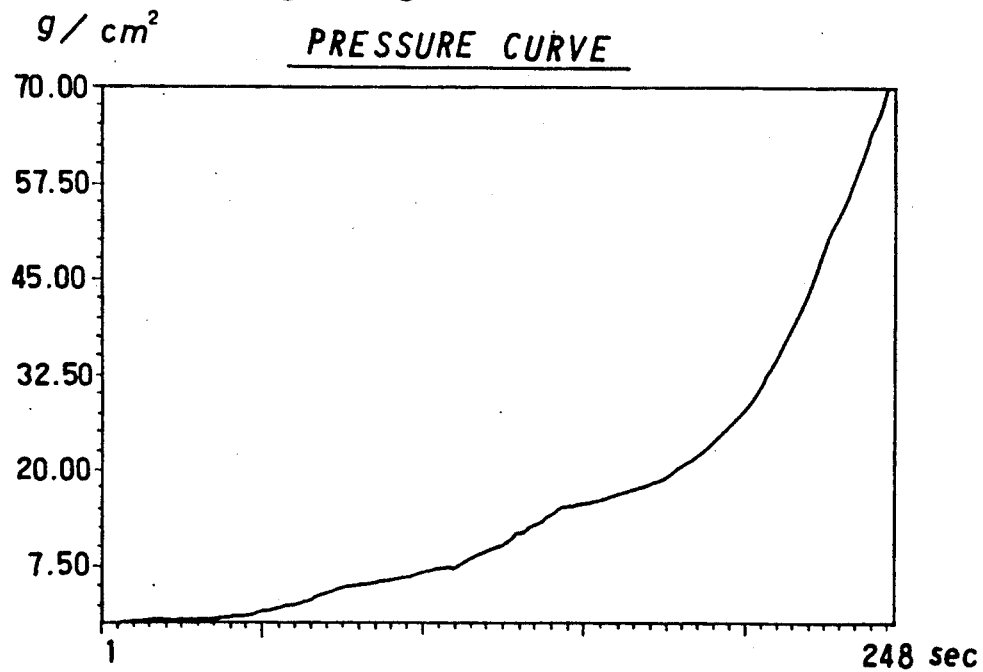

Data obtained by the use of the above system shown in FIG. 9 is shown in FIGS. 10(A) and 10(B). FIG. 10(A) shows a standard pressure curve obtained in a condition in which there is nothing on the air mattress "a". On the other hand, FIG. 10(B) shows a pressure curve obtained in a condition in which a human body weighing 60 Kg is put on the air mattress "a".

As many apparently widely different embodiments of the present invention may be made without departing from the spirit and scope of the present invention as defined in the appended claims, it is to be understood that the present invention is not limited to the specific embodiments thereof.

What is claimed is:

1. A method for weighing a human body and the like, comprising the steps of:
   putting an air mattress beneath said human body and the like being weighed;
   supplying or discharging a flowing air into or from said air mattress to balance a pressure of a body of air contained within said air mattress with a weight of said human body and the like;
   determining an amount of said flowing air being supplied into or discharged from said air mattress;
   determining variation of the pressure of the body of air contained within said air mattress;
   establishing a relationship between the amount of said flowing air and the variation of the pressure of the body of air contained within said air mattress; and
   determining the weight of said human body and the like on the basis of said relationship between the amount of said flowing air and the variation of the pressure of the body of air contained within said air mattress.

2. The method for weighing the human body and the like, as set forth in claim 1, wherein:
   The step of supplying or discharging said flowing air into or from said air mattress to balance the pressure of the body of air contained within said air mattress with the weight of the human body and the like is repeated, and followed every time by the step of determining the variation of the pressure of the body of air contained within said air mattress, whereby data of the variation of the pressure of the body of air contained within said air mattress is obtained.

3. The method for weighing the human body and the like, as set forth in claim 1, wherein:
   the step of supplying or discharging said flowing air into or from said air mattress to balance the pressure of the body of air contained within said air mattress with the weight of the human body and the like is conducted simultaneously in a plurality of said air mattresses, and followed in each of the plurality of said air mattresses by the step of determining the variation of the pressure of the body of air contained within said air mattress, whereby data of the variation of the pressure of the body of air contained within said air mattress is obtained in each of the plurality of said air mattresses.

4. The method for weighing the human body and the like, as set forth in claim 1, wherein:
   the step of supplying or discharging said flowing air into or from said air mattress to balance the pressure of the body of air contained within said air mattress with the weight of the human body and the like is conducted simultaneously in a plurality of said air mattresses to permit the plurality of said air mattresses to communicate with each other by said flowing air, and is followed in each of the plurality of said air mattresses by the step of determining the variation of the pressure of the body of air contained within said air mattress, whereby data of the variation of the pressure of the body of air contained within said air mattress is obtained in each of the plurality of said air mattresses.

* * * * *